United States Patent [19]

Mayumi et al.

[11] 4,384,839
[45] May 24, 1983

[54] CORE MOLD FOR BENT PIPES

[75] Inventors: Masakatsu Mayumi, Osaka; Takeshi Okuyama, Kyoto; Kenji Mitooka, Okayama, all of Japan

[73] Assignee: Sekisui Kagaku Kogyo Kabushiki Kaisha, Osaka, Japan

[21] Appl. No.: 254,665

[22] Filed: Apr. 16, 1981

[30] Foreign Application Priority Data

May 29, 1980 [JP] Japan ................. 55-72629
May 29, 1980 [JP] Japan ................. 55-72630

[51] Int. Cl.³ .................. B29H 5/18; B28B 7/06
[52] U.S. Cl. ............................. 425/403; 249/179; 249/180; 425/470
[58] Field of Search ............ 425/470, 403; 249/179, 249/180, 181, 182, 184

[56] References Cited

U.S. PATENT DOCUMENTS

| | | | |
|---|---|---|---|
| 223,820 | 1/1980 | Shehan | 249/184 |
| 840,637 | 1/1907 | Locher | 249/184 |
| 875,518 | 12/1907 | Georgenson | 249/184 |
| 1,145,228 | 7/1915 | Blayney | 249/184 |
| 1,246,532 | 11/1917 | Bosma | 249/179 |
| 1,538,902 | 5/1925 | Murray | 249/184 |
| 1,598,059 | 8/1926 | Cykler | 249/184 |
| 2,234,784 | 3/1941 | Stolz | 249/179 |
| 2,360,899 | 10/1944 | Scharenberg | 425/403 |
| 2,460,845 | 2/1949 | Rempel | 425/403 |
| 2,882,951 | 4/1959 | Fuchs et al. | 425/403 |
| 3,239,186 | 3/1966 | Esquillan | 249/180 |
| 4,263,249 | 4/1981 | Mayumi et al. | 249/184 |
| 4,298,330 | 11/1981 | Davis | 425/403 |

FOREIGN PATENT DOCUMENTS

51-92930 11/1976 Japan .

*Primary Examiner*—John C. Bleutge
*Assistant Examiner*—A. H. Koeckert
*Attorney, Agent, or Firm*—Wenderoth, Lind & Ponack

[57] ABSTRACT

A core mold for bent pipes including a main body formed of a plurality of hollow cylindrical members connected to each other, the angle between adjacent hollow cylindrical members being fixable at any desired value. The main body may be mounted to a shaft through support members each of which consists of a main body fixed to the main body of the core mold and a shaft support member secured rotatably to the main body of the support member, the shaft support member being slidable along the shaft.

4 Claims, 6 Drawing Figures

CORE MOLD FOR BENT PIPES

BACKGROUND OF THE INVENTION

This invention relates to a core mold for molding bent pipes from reinforced resins, etc., and more specifically, to a core mold from which pipes bent at different bending angles can be formed.

In the prior art, bent pipes bent at different angles are molded from reinforced resins, etc. by using a plurality of core molds having the corresponding different bending angles. No problem arises when molding large quantities of standardized articles of a predetermined angle of bend. But in the production of small numbers of articles of special bending angles, core molds specially designed for the respective angles of bend must be provided, and the cost of production increases. Moreover, the production of such core molds is time-consuming, and an extended period of time is required for delivery of the products.

SUMMARY AND OBJECTS OF THE INVENTION

It is an object of this invention therefore to provide a novel core mold for bent pipes which is free from the defects of the prior art.

According to this invention, there is provided a core mold for bent pipes, the core mold comprising a main body formed of a plurality of hollow cylindrical members connected to each other, the angle between adjacent hollow cylindrical members being fixable at any desired value.

In another aspect, the present invention provides a core mold for bent pipes, the core mold comprising a main body formed of a plurality of hollow cylindrical members connected to each other, the angle between adjacent cylindrical members being fixable at any desired value, said main body being mounted to a shaft through support members, each of the support members consisting of a main body fixed to the main body of the core mold and a shaft support member secured rotatably to the main body of the support member, the shaft support member being slidable along the shaft.

BRIEF DESCRIPTION OF THE DRAWINGS

Specific embodiments of the present invention are described below with reference to the accompanying drawings in which.

DETAILED DESCRIPTION OF THE PREFERRED EMBODIMENTS

Figure 1:
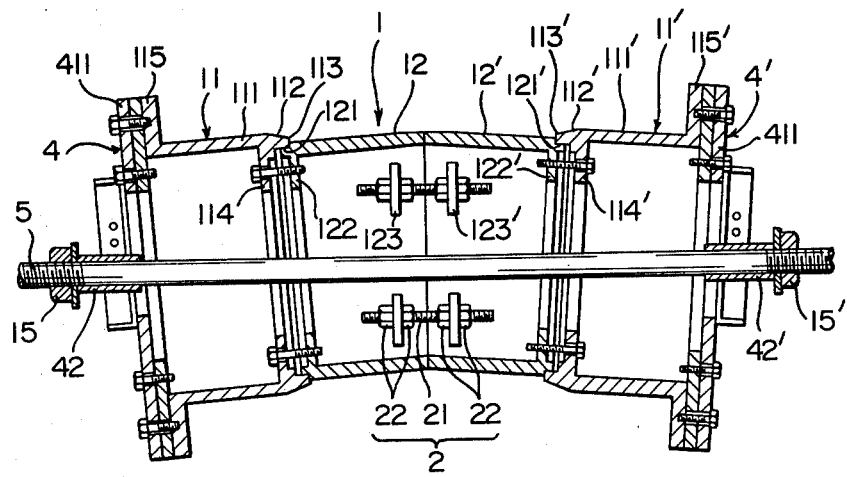
FIG. 1 is a sectional view of the core mold of the invention in one embodiment.

Referring to FIG. 1, the reference numerals 11 and 11' represent hollow cylindrical members for molding coupling parts of a bent pipe, which include large-diameter sections 111 and 111' and inclined sections 112 and 112' whose outside diameters become gradually smaller as they approach each other. Protruding portions 113 and 113' are provided at the end portions of the inclined sections 112 and 112'. Stop pieces 114 and 114', each having a hole permitting free passage of a bolt, are provided on the inner circumferential surfaces of the inclined sections 112 and 112'. Collars 115 and 115', each having a female screw portion, are provided exteriorly of the other ends of the large-diameter sections 111 and 111'.

The reference numerals 12 and 12' represent hollow cylindrical members for molding a central portion of a bent pipe, which include stepped portions 121 and 121' at the end surfaces of the cylindrical members 12 and 12' which are on the side of the cylindrical members 11 and 11'. Stop pieces 122 and 122', each having a female screw portion, are provided on the inner circumferential surfaces of the cylindrical members 12 and 12'. Furthermore, stop pieces 123 and 123', each having a hole permitting free passage of a bolt, are provided on the inner circumferential surfaces of the other ends of the cylindrical members 12 and 12', respectively. The stop pieces 123 and 123' are welded to the inner wall of the cylindrical members 12 and 12'.

The hollow cylindrical member 11 and the hollow cylindrical member 12 are connected to each other by causing the protruding portion 112 and the stepped portion 121 at respective end portions of the cylindrical members 11 and 12 to abut each other, and clamping the stop pieces 114 and 122 by means of bolts. The resulting connected assembly and an identically connected assembly of the cylindrical member 11' and the cylindrical member 12' are connected to form a main body 1 of a core mold by the coupling of the respective stop pieces 123 and 123' of the cylindrical members 12 and 12'. Coupling between the stop pieces 123 and 123' is effected by using a coupling device 2 consisting of a bolt 21 which passes freely through the holes of the stop pieces 123 and 123' and nuts 22 for fixing the bolt 21 to the stop pieces.

In the embodiment shown in FIG. 1, when the cylindrical members 12 and 12' are caused to abut each other along their entire peripheries and connected, they show slight bending. Alternatively, the same cylindrical members 12 and 12' can be connected to each other at a broad range of arbitrary bent angles by causing them to abut at one point along their entire periphery, connecting them so that the other ends thereof in the diametrical direction are spaced from each other, and optionally changing the distance between the aforesaid other ends.

The methods of connection shown in FIGS. 2 and 3 will be described in detail hereinbelow.

Figure 5:
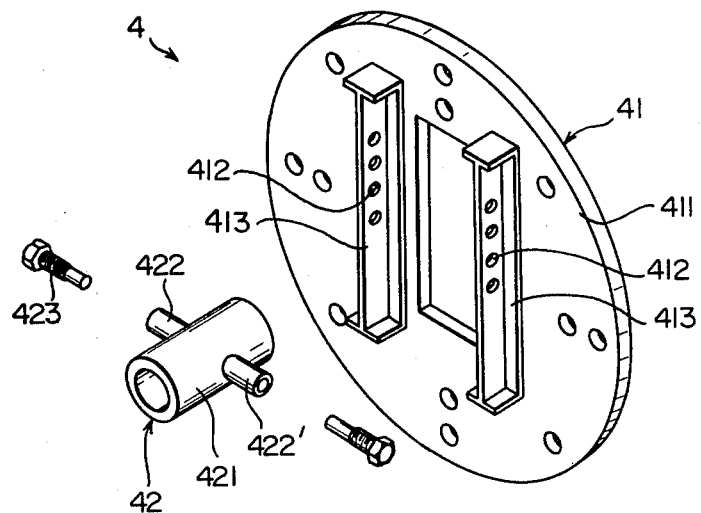
FIG. 5 is a perspective view showing a support member, before assembling, which can be used in the invention.
Figure 6:
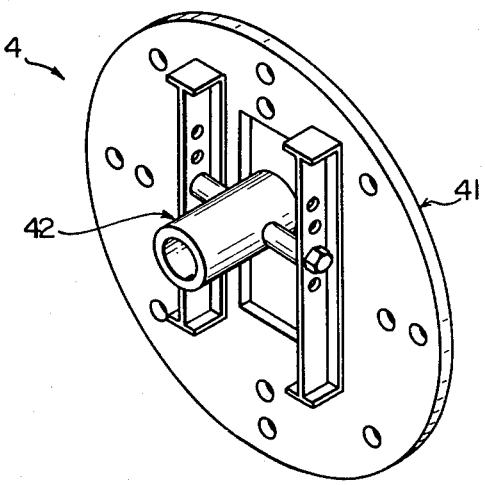
FIG. 6 is a perspective view of the support material of FIG. 5 after assembling.

The reference numerals 4 and 4' represent support members for mounting the main body 1 of the core mold to a shaft 5. Since the support members 4 and 4' are of the same shape, only the support member 4 will be described in detail with reference to FIGS. 5 and 6.

The support member 4 is composed of a main body 41 and a shaft support member 42. The main body 41 consists of a disc 411 having a rectangular through-hole opened at its center and projecting pieces 413 and 413' fixed to longer sides of the rectangular opening hole, and a plurality of through-holes 412 and 412' are provided in the projecting pieces 413 and 413'. The shaft support member 42 consists of a short pipe 421 and shorter pipes 422 and 422' provided exteriorly of the short pipe 421. The shorter pipes 422 and 422' of the shaft support member 42 are fitted in the opposing through-holes 412 and 412' of the projecting pieces 413 and 413' by means of pins 423, so that the shaft support member 42 is rotatable about the pins 423 as a fulcrum with regard to the main body 41 of the support member. The disc 411 has holes permitting free passage of bolts at those positions which correspond respectively to the female screw portions provided in the collar 115 of the main body 1 of the core mold. As shown in FIGS. 1, 2 and 3, the discs 411 and 411' of the support members 4 and 4' abut against the side surfaces of the collars 115 and 115' of the main body 1 of the core mold, and bolts are loosely inserted into the aforesaid holes provided in the discs 411 and 411'. The support members 4 and 4' are secured to both ends of the main body 1 of the core mold by screwing the bolts into the female screws provided in the collars 115 and 115' of the main body 1 of the core mold.

Figure 2:
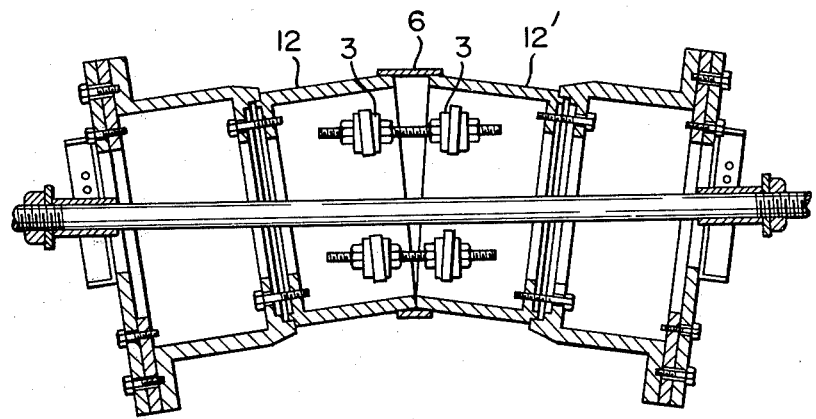
FIG. 2 is a sectional view of another embodiment of the core mold of the invention.
Figure 3:
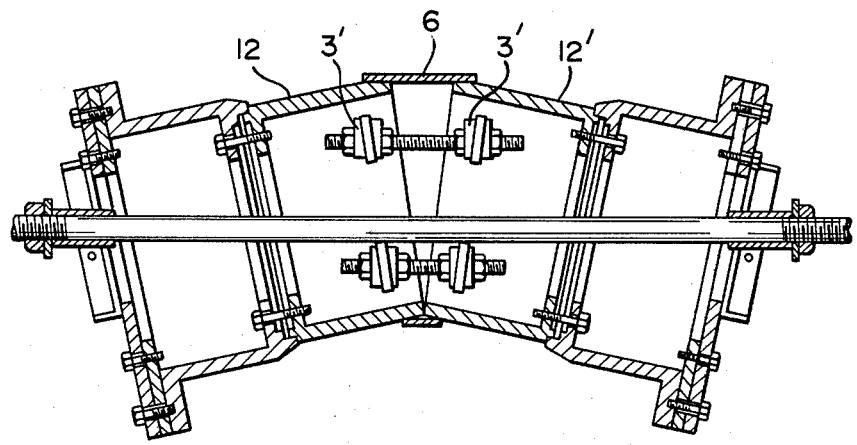
FIG. 3 is a sectional view of still another embodiment of the core mold of the invention.

The core mold for bent pipes in accordance with this invention which is shown in FIGS. 1 to 3 can be built in the following manner.

The hollow cylindrical members 12 and 12' for molding a central portion of a bent pipe are caused to abut each other, and the bolt 21 is inserted into the stop pieces 123 and 123' and clamped by nuts 22. As stated hereinabove, the hollow cylindrical members 12 and 12' are formed such that when they are caused to abut, both are in the slightly bent state.

For example, when the aforesaid clamping is done by using tapered washers 3, the hollow cylindrical members 12 and 12' are connected to each other in the more bent state shown in FIG. 2. If more acutely tapered washers 3' are used, the hollow cylindrical members 12 and 12' are connected to each other in a much more bent state as is seen from FIG. 3.

After connecting the cylindrical members 12 and 12', the cylindrical members 11 and 11' for molding a coupling portion are connected to the other ends respectively of the cylindrical members 12 and 12' by means of the stop pieces 114 and 122 mentioned above.

Then, the shaft 5 is mounted between the shaft support members 42 and 42' at the outside ends of the cylindrical members 11 and 11'. Since the shaft support member 42 is freely rotatable with respect to the main body 41 of the support member, the shaft 5 can be easily inserted through the shaft support members 42 and 42' irrespective of the bending angle between the cylindrical members 12 and 12'. Then, the shaft 5 and the support member 42 are fixed in a predetermined relative position using the nuts 15 and 15'.

Figure 4:
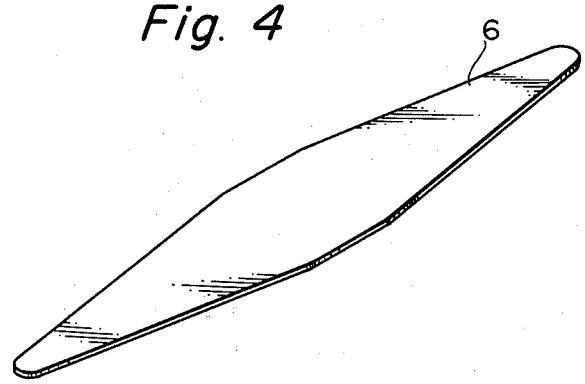
FIG. 4 is a perspective view showing one example of a covering material used in the embodiments of the invention.

When there is a space between the cylindrical members 12 and 12' of the main body 1 of the core mold as shown in FIG. 2 or 3, that space is covered with a diamond-shaped plate-like covering material 6 as shown in FIG. 4.

In the manner described above, a plurality of hollow cylindrical members 11, 11', 12 and 12' forming the main body of the core mold are connected in series, and cylindrical members 12 and 12' in one pair among them are connected at a desired bending angle, and the series-connected cylindrical members are fixed by the shaft 5. Thus, a stable core mold which undergoes little deformation during the molding step can be built.

If desired, a bent pipe can be molded while rotating the mold about the shaft 5. By changing the position of inserting the pin 423 into the hole 412, the relative position of the shaft 5 and the main body 1 of the mold can be changed. This can minimize eccentricity of the mold during rotation.

The core mold of this invention is used suitably for the molding of a bent pipe from a reinforced plastic material. The reinforced resin or plastic material, as used herein, denotes a material comprising a synthetic resin, for example a thermosetting resin such as an unsaturated polyester, and a reinforcing material such as glass fibers. A bent pipe can be molded, for example, by impregnating a mat of glass fibers with a solution of a resin such as an unsaturated polyester containing a curing agent, winding the prepreg about the periphery of the core mold, thereafter wrapping a prepreg obtained by impregnating a long strip of reinforcing material such as a glass roving with a solution of an unsaturated polyester and a curing agent about the first-mentioned prepreg, curing the prepregs, and thereafter pulling out the core mold.

In the embodiments shown in FIGS. 1 to 3, the plurality of cylindrical members constituting the core mold consist of a combination of relatively large-diameter cylindrical members and smaller-diameter cylindrical members. Needless to say, however, all of these cylindrical members may have the same diameter, if required.

The core mold of this invention described above consists of a plurality of cylindrical members connected to each other in series, and the angle of adjacent cylindrical members is adapted to be fixed at an arbitrary value. By building the mold while adjusting the bending angle of the coupling portion of the mold at a desired value within a broad range, various bent pipes having different bending angles can be molded by using a single core mold.

In the core mold of this invention, the main body formed by connecting the plurality of cylindrical members is mounted on a shaft through support members, and the shaft support portions rotatably secured to the main bodies of the support members are slidable along, and fixable to, the shaft. Accordingly, after building the core mold at a desired angle of bending, it can be fixed firmly by the shaft. Thus, the core mold scarcely deforms during the molding of a bent pipe, and the operation is very stable.

What we claim is:

1. A core mold for bent pipes, comprising:
(a) first and second hollow cylindrical members having adjacent ends and opposite ends, and having respective first and second longitudinal axes in a vertical plane;
(b) means for connecting said first and second cylindrical members end-to-end at said adjacent ends such that said first and second longitudinal axes intersect each other at an angle therebetween which may be continuously varied over a range by rotational movement of said first and second cylindrical members toward or away from each other about a first horizontal axis perpendicular said plane;
(c) means for tightening and fixing said first and second cylindrical members with their respective first and second longitudinal axes at a desired angle of intersection in said range, said tightening and fixing means including:
(1) a rigid straight shaft extending through said first and second cylindrical members parallelly of said vertical plane;

(2) first and second main support members respectively fixed to said opposite ends of said first and second cylindrical members;
(3) first and second rotatable support means, respectively located at said first and second main support members, for supporting said shaft so as to slide along said shaft if said first and second cylindrical members are moved relative to each other so as to vary said angle between said first and second longitudinal axes;
(4) first and second mounting means for respectively rotatably mounting said first and second rotatable support means to said first and second support members for respective rotation about first and second rotational axes parallel said first horizontal axis; said first mounting means including means for rotatably mounting said first rotatable support means to said first main support member at any one of a first plurality of vertically spaced locations for rotation about a corresponding one of a first plurality of vertically spaced rotational axes parallel said first horizontal axis; whereby said shaft may be vertically adjusted; and
(5) means for locking said first and second rotatable support means against sliding along said shaft.

2. A core mold as in claim 1, wherein said second mounting means includes means for rotatably mounting said second rotatable support means to said second main support member at any one of a second plurality of vertically spaced locations for rotation about a corresponding one of a second plurality of vertically spaced rotational axes parallel said first horizontal axis; whereby said shaft may be vertically adjusted at both ends thereof.

3. A core mold for bent pipes, comprising:
(a) first and second hollow cylindrical members having adjacent ends and opposite ends, and having respective first and second longitudinal axes in a plane;
(b) means for connecting said first and second cylindrical members end-to-end at said adjacent ends such that said first and second longitudinal axes intersect each other at an angle therebetween which may be continuously varied over a range by movement of either of said first and second cylindrical members relative to the other;
(c) means for tightening and fixing said first and second cylindrical members with their respective first and second longitudinal axes at a desired angle of intersection in said range, said tightening and fixing means including:

(1) a rigid and straight shaft extending through said first and second cylindrical members;
(2) first and second main support members, respectively fixed to said opposite ends of said first and second cylindrical members;
(3) first and second rotatable support means, respectively located at said first and second main support members, for supporting said shaft so as to slide along said shaft if either of said first and second cylindrical members is moved relative to the other so as to vary said angle between said first and second longitudinal axes;
(4) mounting elements located at said opposite ends of said first and second cylindrical members including:
 (A) first mounting means, located at said first main support member, for rotatably mounting said first rotatable support means to said first main support member at any one of a first plurality of positions each of which positions defines a corresponding one of a first plurality of parallel spaced axes of rotation of said first rotatable support means intersecting said plane at different first distances from said first longitudinal axis, and
 (B) second mounting means, located at said second main support member, for rotatably mounting said second rotatable support means to said second main support means to said second main support member at any one of a second plurality of positions each of which positions defines a corresponding one of a second plurality of parallel spaced axes of rotation of said second rotatable support means intersecting said plane at different second distances from said second longitudinal axis; whereby the position of said shaft relative to the intersection of said first and second longitudinal axes can be adjusted; and
(5) means for locking said first and second rotatable support means against sliding along said shaft.

4. A core mold as in claim 3, wherein each of said first and second rotatable support means comprises a cylindrical support surrounding a portion of the periphery of said shaft; and each of said first and second mounting means comprises parallel axles extending outwardly from opposite sides of said cylindrical support and two spaced projection members, fixed to the one of said first and second main support members at which the one of the first and second mounting means of which it is a part is located, having a plurality of pairs of opposing holes aligned perpendicularly of said plane, each of said pairs of holes being sized to rotatably receive said axles.

* * * * *